(12) United States Patent
Tomizawa et al.

(10) Patent No.: US 10,438,384 B2
(45) Date of Patent: Oct. 8, 2019

(54) IMAGE DISPLAY SYSTEM, IMAGE CONTROL DEVICE, DISPLAY DEVICE AND DISPLAY CONTROL METHOD

(71) Applicant: NEC Display Solutions, Ltd., Tokyo (JP)

(72) Inventors: Michio Tomizawa, Tokyo (JP); Koichi Ara, Tokyo (JP)

(73) Assignee: NEC DISPLAY SOLUTIONS, LTD., Tokyo (JP)

( * ) Notice: Subject to any disclaimer, the term of this patent is extended or adjusted under 35 U.S.C. 154(b) by 37 days.

(21) Appl. No.: 15/317,859

(22) PCT Filed: Aug. 22, 2014

(86) PCT No.: PCT/JP2014/071990
§ 371 (c)(1),
(2) Date: Dec. 9, 2016

(87) PCT Pub. No.: WO2016/027365
PCT Pub. Date: Feb. 25, 2016

(65) Prior Publication Data
US 2017/0116763 A1    Apr. 27, 2017

(51) Int. Cl.
*G06T 11/20* (2006.01)
*G06F 3/0354* (2013.01)
*G06F 3/0488* (2013.01)

(52) U.S. Cl.
CPC ........ *G06T 11/203* (2013.01); *G06F 3/03545* (2013.01); *G06F 3/04883* (2013.01); *G06F 2203/04808* (2013.01)

(58) Field of Classification Search
None
See application file for complete search history.

(56) References Cited

U.S. PATENT DOCUMENTS

2005/0275886 A1* 12/2005 Takeuchi ........... H04N 1/32358
358/1.15
2006/0066925 A1* 3/2006 Hasegawa ............ H04N 1/6011
358/518

(Continued)

FOREIGN PATENT DOCUMENTS

CN      101315586 A    12/2008
CN      102855132 A     1/2013

(Continued)

OTHER PUBLICATIONS

International Search Report (ISR) (PCT Form PCT/ISA/210), in PCT/JP2014/071990, dated Sep. 16, 2014.

(Continued)

*Primary Examiner* — Yanna Wu
(74) *Attorney, Agent, or Firm* — McGinn I.P. Law Group, PLLC.

(57) ABSTRACT

An image display system includes: a display device; a detecting device for detecting a position pointed by an input device, on a display screen of the display device; and a display control device that, in accordance with a drawing on the display screen using the input device, causes the display device to display an image corresponding to the drawing in conformity with a setting corresponding to the position on the display screen at which the drawing has been started. The settings are different from each other depending on the areas on the display screen defined by multiple reference points provided thereon.

11 Claims, 13 Drawing Sheets

(56) References Cited

U.S. PATENT DOCUMENTS

| | | | |
|---|---|---|---|
| 2007/0057923 A1 | 3/2007 | Kitazaki | |
| 2013/0187856 A1* | 7/2013 | Konno | G06F 3/0481 345/163 |
| 2014/0168122 A1* | 6/2014 | Jiang | G06F 3/0485 345/173 |
| 2014/0168168 A1* | 6/2014 | Ichieda | G06F 3/042 345/175 |
| 2015/0035778 A1* | 2/2015 | Hirakawa | G06F 3/0416 345/173 |
| 2015/0264169 A1* | 9/2015 | Yim | H04M 1/72563 455/411 |
| 2017/0269803 A1* | 9/2017 | Monnig | G06F 3/0484 |

FOREIGN PATENT DOCUMENTS

| | | |
|---|---|---|
| CN | 103870233 A | 6/2014 |
| JP | 2001-014102 A | 1/2001 |
| JP | 2005-202950 A | 7/2005 |
| JP | 2007-080076 A | 3/2007 |
| JP | 2010-257315 A | 11/2010 |
| JP | 2011-028629 A | 2/2011 |
| JP | 2013-164489 A | 8/2013 |
| JP | 2013-196486 A | 9/2013 |
| JP | 2014-013477 A | 1/2014 |

OTHER PUBLICATIONS

Chinese Office Action dated Jun. 24, 2019, in counterpart Chinese Patent Application No. 201480080636.X, with an English translation thereof.

* cited by examiner

IMAGE DISPLAY SYSTEM, IMAGE CONTROL DEVICE, DISPLAY DEVICE AND DISPLAY CONTROL METHOD

TECHNICAL FIELD

The present invention relates to an image display system, display control device, display device and display control method.

BACKGROUND ART

As one among image display systems using a display device such as a projector, liquid crystal display, etc., there has been the interactive white board (IWB; Interactive White board) system. The IWB system is a system that is capable of manipulating the display image on the display device by using an input device such as an electronic pen or the like. In the IWB system, when the user performs a drawing on the display screen of the display device using an input device, the position pointed by the input device in accordance with the drawing is detected, and based on the detection result an image corresponding to the drawing (e.g., the trace of the position pointed by the input device) is displayed in a superimposed manner on the display image of the display device. According to the IWB system, the user is able to add text and patterns on the displayed image as if it were handwritten.

In use of the IWB system, there are cases where multiple users perform drawing by using different input devices. In this case, it is preferable that images drawn by different users can be discriminated by displaying different colors or by other methods.

As a method of discriminating images drawn by multiple users, Patent Document 1 (JP2013-164489A) discloses a method in which a plurality of input devices each are assigned with unique ID information so as to detect the ID information of the input device being used for drawing when a drawing is performed. According to this method, since each input device used for drawing can be identified even when multiple users perform drawing by using different input devices, it is possible to discriminate the image corresponding to drawing made by each input device, by showing display with different colors and/or different line types or any other method.

There has been another method in which the display screen of the display device is divided (into left and right parts, for example) so as to display images corresponding to drawings in different areas, in different modes. When in the IWB system multiple users (two users, for example) perform drawing, it is mostly expected that one user will stay on the right side of the display device and performs drawing mainly on the right side of the display image area while the other user will stay on the left side of the display device and performs drawing mainly on the left side of the display image area. In this case, it is possible to discriminate images corresponding to drawings of multiple users by dividing the display image into left and right areas and displaying the image corresponding to the drawing to the left area and the image corresponding to the drawing to the right area in different modes.

RELATED ART DOCUMENTS

Patent Documents

Patent Document 1: JP2013-164489A

SUMMARY

Problems to be Solved by the Invention

The method disclosed by Patent Document 1 requires input devices allotted with unique ID information and with the application (drawing application) for identifying the ID information assigned to each input device. Since it is difficult to apply these interchangeably between IWB systems, the method disclosed in Patent Document 1 leads to a problem in which there is a lack of versatility.

The method of displaying images in different modes in accordance with drawings on the divided display image areas of the display device does not need to assign any unique ID information to input devices, hence versatility can be assured. In this method, however, the area in which each user can draw is limited so as to give rise to a problem, e.g., lack of convenience.

The object of the present invention to provide an image display system, display control device, display device and display control method, which enable discrimination between images drawn by multiple users while assuring versatility and improving convenience.

Means for Solving the Problems

In order to achieve the above object, an exemplary aspect of an image display system of the present invention includes:
 a display device;
 a detecting device for detecting a position pointed by an input device, on a display screen of the display device; and,
 a display control device that, in accordance with a drawing on the display screen using the input device, causes the display device to display an image corresponding to the drawing in conformity with a setting corresponding to the position on the display screen at which the drawing has been started, wherein
 the settings are different from each other depending on the areas on the display screen defined by multiple reference points provided thereon.

In order to achieve the above object, an exemplary aspect of a display control device includes a display controller that, in accordance with a drawing on a display screen of a display device using an input device that points to a position on the display screen, causes the display device to display an image corresponding to the drawing in conformity with a setting corresponding to the position on the display screen at which the drawing has been started, wherein
 the settings are different from each other depending on areas on the display screen defined by multiple reference points provided thereon.

In order to achieve the above object, an exemplary aspect of a display device of the present invention includes:
 a display unit; and,
 the above-described display controller.

In order to achieve the above object, an exemplary aspect of a display control method of the present invention is a display control method of a display device, and includes the step of:
 in accordance with a drawing on a display screen of a display device using an input device that points to a position on the display screen,
 causing the display device to display an image corresponding to the drawing in conformity with a setting corresponding to the position on the display screen at which the drawing has been started, wherein, the settings are different from each other depending on areas on the display screen determined by multiple reference points provided thereon.

Effect of the Invention

According to the present invention, it is possible to discriminate images drawn by multiple users while assuring versatility and improved convenience.

EXEMPLARY EMBODIMENT

Now, the embodiment for carrying out the invention will be described with reference to the drawings.

Figure 1:
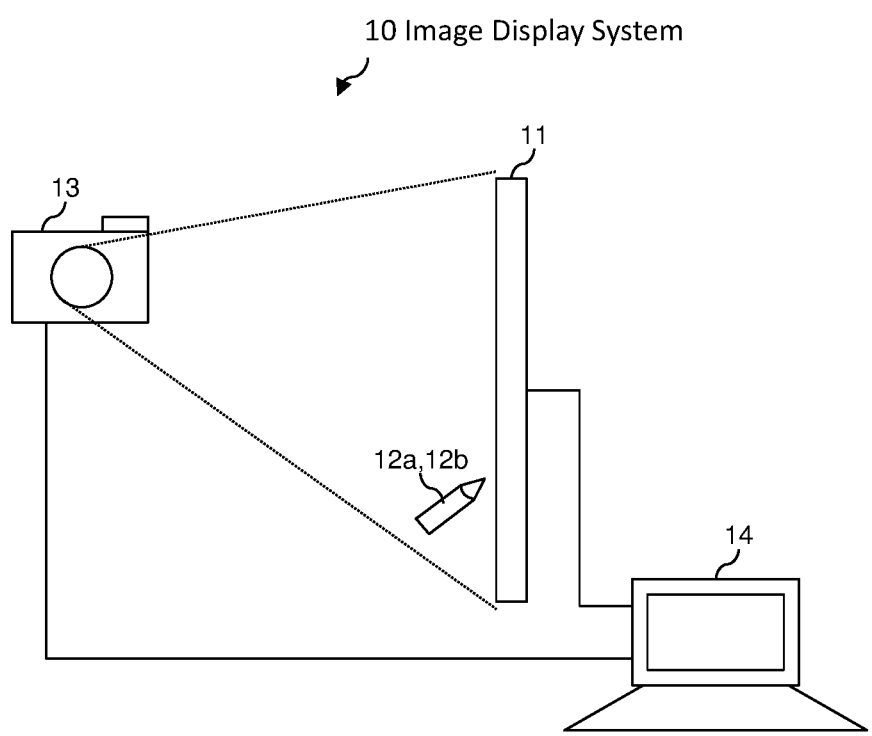
FIG. 1 is a diagram showing a configuration of an image display system according to one exemplary embodiment of the present invention.

FIG. 1 is a diagram showing a configuration of image display system 10 of one exemplary embodiment of the present invention. Image display system 10 is a so-called IWB system which, as drawing on the display screen of a display device is performed by an input device such as an electronic pen etc., detects the position of the drawing pointed by the input device and displays an image corresponding to the drawing, based on the detection result.

Image display system 10 shown in FIG. 1 includes display device 11, a plurality of input devices 12 (12a, 12b), detecting device 13 and display control device 14.

Display device 11 is, for example a liquid crystal display or the like, and displays images following the control of display control device 14.

Input device 12 is an input device used to point the position on the displayed image of display device 11 by the user and has a pen-shaped body, for example. When pointing to a desired position on the displayed image of display device 11, the user presses the position with the front end (pen tip) of the body of input device 12. Input device 12 gives off infrared rays in response to the pressing action.

Detecting device 13 has an image-taking function and is arranged so as to take an image of the entire display screen of display device 11. Detecting device 13 detects the output position of the infrared ray of input device 12 and the position on the display screen of display device 11. The position on the display screen of display device 11, pointed by input device 12 is determined based on the detection result detected by detecting device 13. Detecting device 13 outputs to display control device 14 signals (detection result) corresponding to the position on the display screen of display device 11 pointed by input device 12.

Display control device 14 is, for example a personal computer and controls display of display device 11. For example, as drawing has been done on the display screen of display device 11 by means of input device 12 and the detection result of the position of the drawing pointed to by input device 12 is output from detecting device 13, display control device 14, based on the detection result, displays the image corresponding to the drawing on display device 11.

Though description herein was made giving an example where display device 11 is a display such as a liquid crystal display or the like, display device 11 may be a projector, i.e., a projection type display device.

Figure 2:
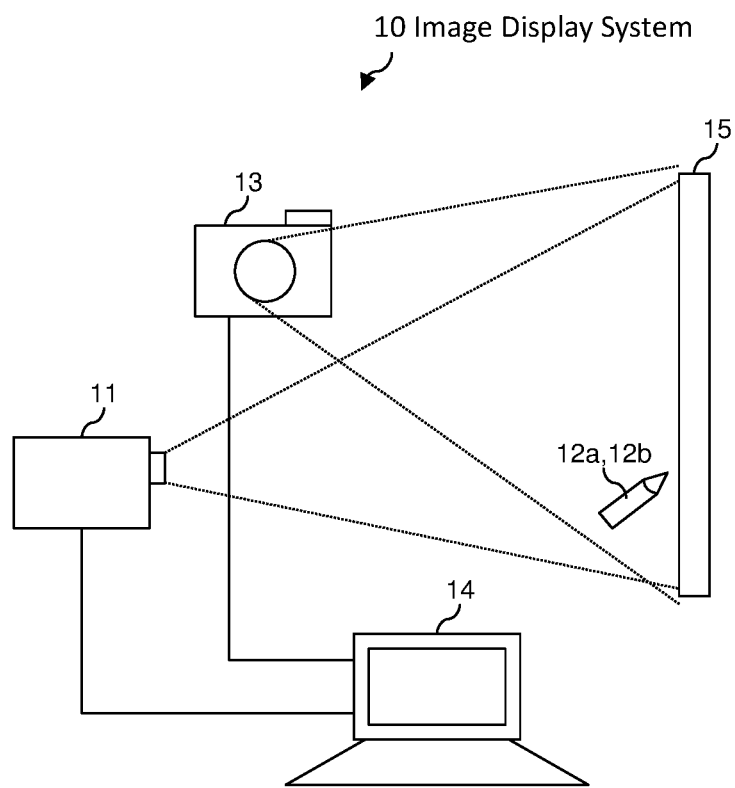
FIG. 2 is a diagram showing another configuration of an image display system according to one embodiment of the present invention.

FIG. 2 is a diagram showing a configuration of image display system 10 when display device 11 is a projector. Here, in FIG. 2 the same components are allotted with the same reference numerals without description.

When display device 11 is a projector, as shown in FIG. 2 display device 11 projects and displays an image on a projection screen 15 in accordance with control of display control device 14. Also, detecting device 13 is arranged so as to be able to take an image of the entire projection area (display screen) of display device 11.

Next, the configuration of display control device 14 will be described. Herein, configurations of display device 11, input device 12 and detecting device 13 are well known to those skilled in the art and are not directly related to the present invention, so that description is omitted.

Figure 3:
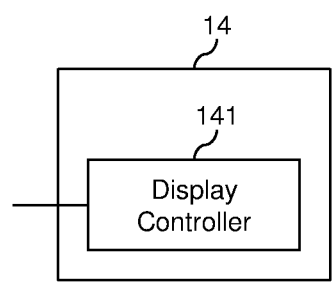
FIG. 3 is a block diagram showing a partial configuration of the display control devices shown in FIGS. 1 and 2.

FIG. 3 is a block diagram showing a partial configuration of display control device 14.

Display control device 14 shown in FIG. 3 includes display controller 141.

Display controller 141 communicates with display device 11 and detecting device 13 via a communication unit, not shown in FIG. 3, but the communication unit is included in display control device 14 to control display of display device 11. For example, display control unit 141, upon receiving the result detection by detecting device 13 corresponding to the drawing with input device 12, from detecting device 13 via the communication unit, displays the image corresponding to the drawing on display device 11, based on the detection result.

Next, the operation of image display system 10 of the present exemplary embodiment will be described.

Figure 4:
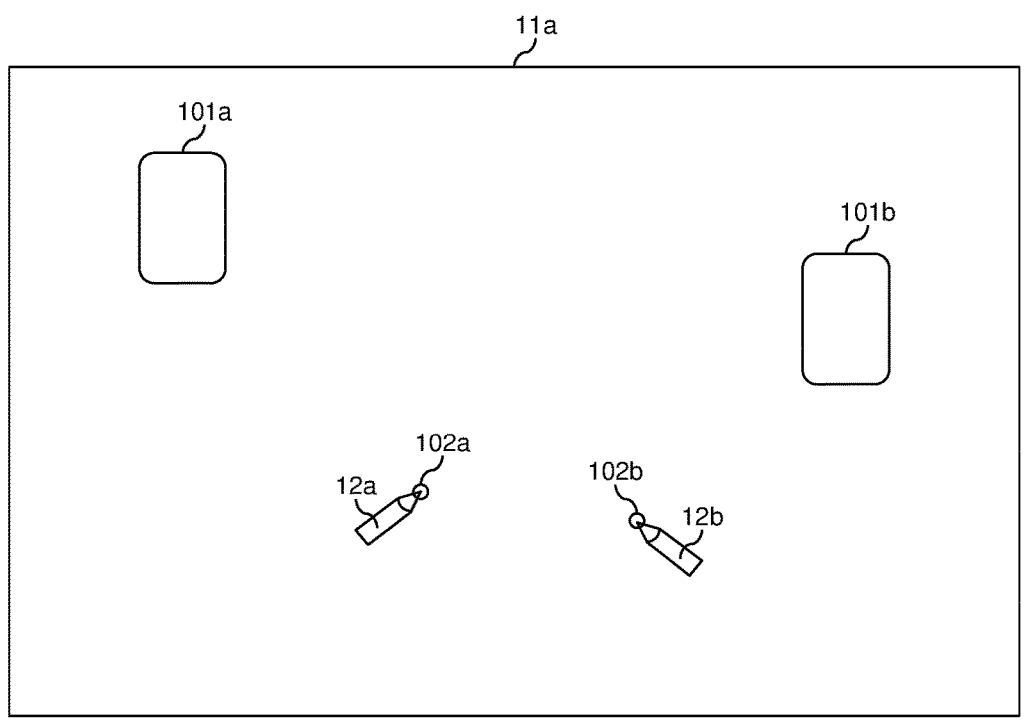
FIG. 4 is a diagram showing one display example of the display devices shown in FIGS. 1 and 2.

FIG. 4 is a diagram showing display screen 11a of display device 11.

Display control device 14 (display controller 141) has stored multiple patterns different in color and line type to display drawn images, as settings for displaying images (which will be referred to hereinbelow as drawn images) corresponding to drawing with input device 12. Display control device 14 causes display device 11 to display dialogues 101 (101a, 101b) respectively corresponding to different settings for displaying drawn images.

Suppose that drawings (pointing positions on display screen 11a) are started by input device 12a and 12b with the aforementioned dialogues 101 displayed. It is assumed in the following description that the point at which input device 12a begins drawing is point 102a and the point at which input device 12b begins drawing is point 102b.

Figure 5:
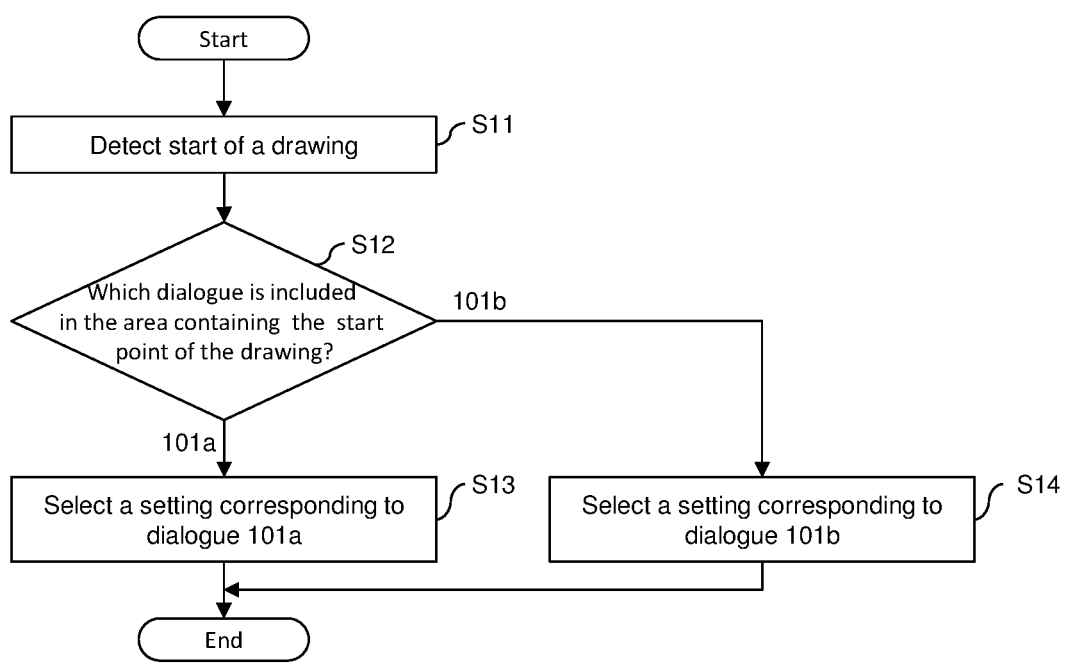
FIG. 5 is a flow chart for illustrating the operation of the display control devices shown in FIGS. 1 and 2.

When it is determined based on the detection result from detecting device 13 that drawing has been started, display control device 14 (display controller 141) selects a setting for displaying a drawn image corresponding to that drawing. FIG. 5 is a flow chart showing the operation of display control device 14 (display controller 141) when a setting for drawn image display is selected.

Figure 6:
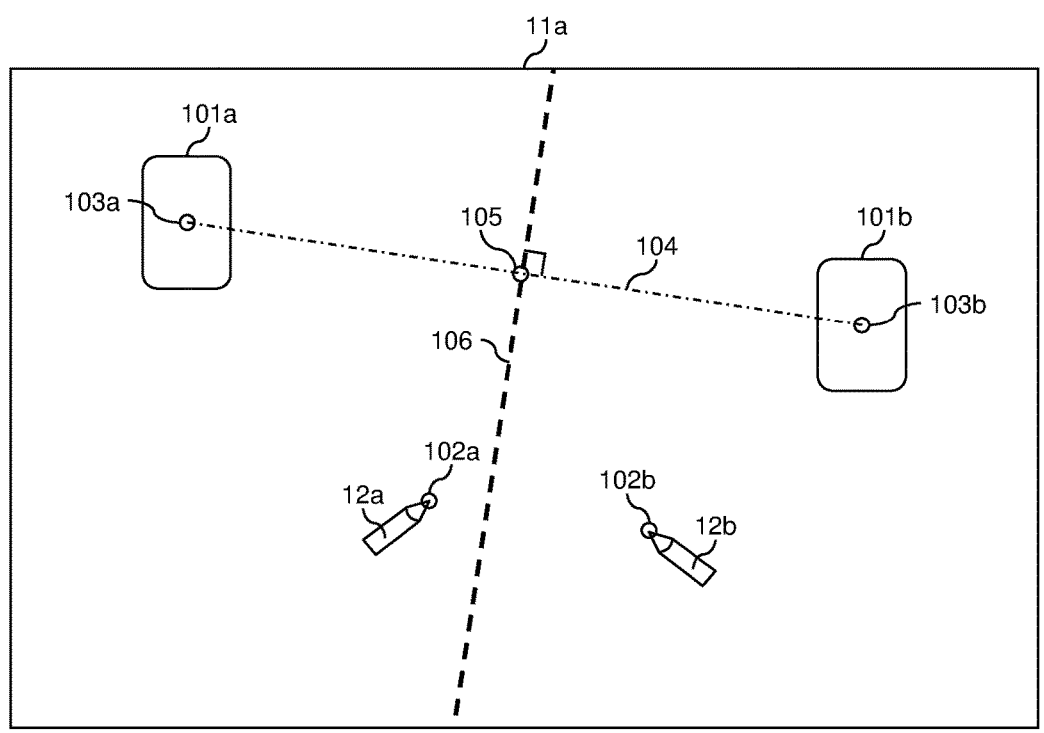
FIG. 6 is a diagram for illustrating the operation in selecting settings for display of drawn images in the display control devices shown in FIGS. 1 and 2.

First, display control device 14 sets reference points 103 (103a, 103b) corresponding to dialogues 101a and 101b, respectively, as shown in FIG. 6. Then, display control device 14 determines line segment 106 that passes through middle point 105 of line segment 104 connecting between reference point 103a and reference point 103b and is perpendicular to line segment 104. Display screen 11a is divided by line segment 106 into two areas, i.e., the area including dialogue 101a (reference point 103a) and the area including dialogue 101b (reference point 103b).

Display control device 14, upon detection of start of a drawing (Step S11), determines whether the dialogue included in the area containing the drawing start point is dialogue 101a or dialogue 101b (Step S12).

Upon determining that dialogue 101a is included in the area containing the drawing start point, display control device 14 selects the setting corresponding to dialogue 101a as a setting for display of the drawn image corresponding to the drawing (Step S13). On the other hand, as determining that the drawing start point is close to dialogue 101b, display control device 14 selects the setting for dialogue 101b as a setting relating to display of the drawn image corresponding to the drawing (Step S14).

In the example shown in FIG. 6, since point 102a resides in the area including dialogue 101a, display control device 14 causes display device 11 to display the drawn image corresponding to the drawing started from point 102a in accordance with the setting corresponding to dialogue 101a. On the other hand, since point 102b resides in the area including dialogue 101b, display control device 14 causes display device 11 to display the drawn image corresponding to the drawing started from point 102b in accordance with the setting corresponding to dialogue 101b.

In this way, display control device 14 sets up multiple areas on display screen 11a based on multiple reference points provided thereon so as to make each area correspondent to a setting (setting for the dialogue included in each area) for display of different drawn images. Then, once a drawing begins, display control device 14 displays the drawn image of the drawing in accordance with the setting for the area including the drawing start point. It should be noted that display control device 14 does not have any knowledge of whether each drawing is performed by input device 12a or input device 12b. However, it is possible to discriminate the image of drawing by each user, by changing the mode of display of the drawn image of drawing, based on the drawing start point.

In accordance with the present exemplary embodiment thus configured, image display system 1 includes display device 11, detecting device 13 that detects positions on display screen of display device 11 pointed by input devices 12, and display control device 14. Display control device 14, upon receiving an output of the detection result from detecting device 13 in accordance with a drawing on the display screen by an input device, displays an image corresponding to the drawing in accordance with the setting corresponding to the drawing start point. Herein, the settings for display of the images corresponding to drawings differ from each other, depending on the areas on the display screen of display device 11 determined based on the reference points thereon.

Accordingly, when drawings are performed using multiple input devices 12, it is possible to display images for individual drawings in accordance with different settings by changing the position on the display screen from which drawing is started. Further, since the setting for display of an image for a drawing is determined in accordance with the position at which the drawing is started, the range where the user can begin drawing will not be limited. Accordingly, it is possible to improve convenience.

Further, it is possible to display each image in a distinguishing manner to deal with drawings using multiple input devices without the necessity of using dedicated input devices assigned with ID information, hence versatility of input devices, drawing applications etc., can be assured.

Variational Example 1

Though the above exemplary embodiment was explained by giving an example where two dialogues are present, the present invention should not be limited to this. Three or more dialogues may be present.

Figure 7:
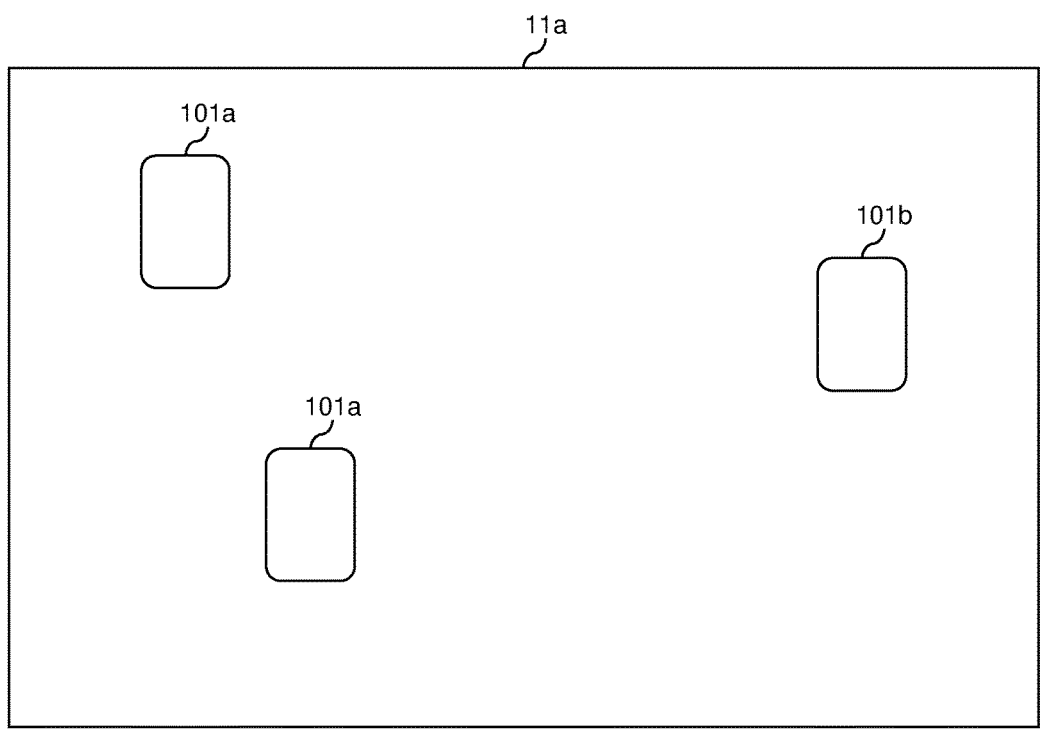
FIG. 7 is a diagram for illustrating the operation according to variational example 1 of the display control devices shown in FIGS. 1 and 2.

For example, as shown in FIG. 7, when three dialogues 101 (101a, 101b, 101c) are displayed, display control device 14 selects settings for display of drawn images as follows.

Figure 8:
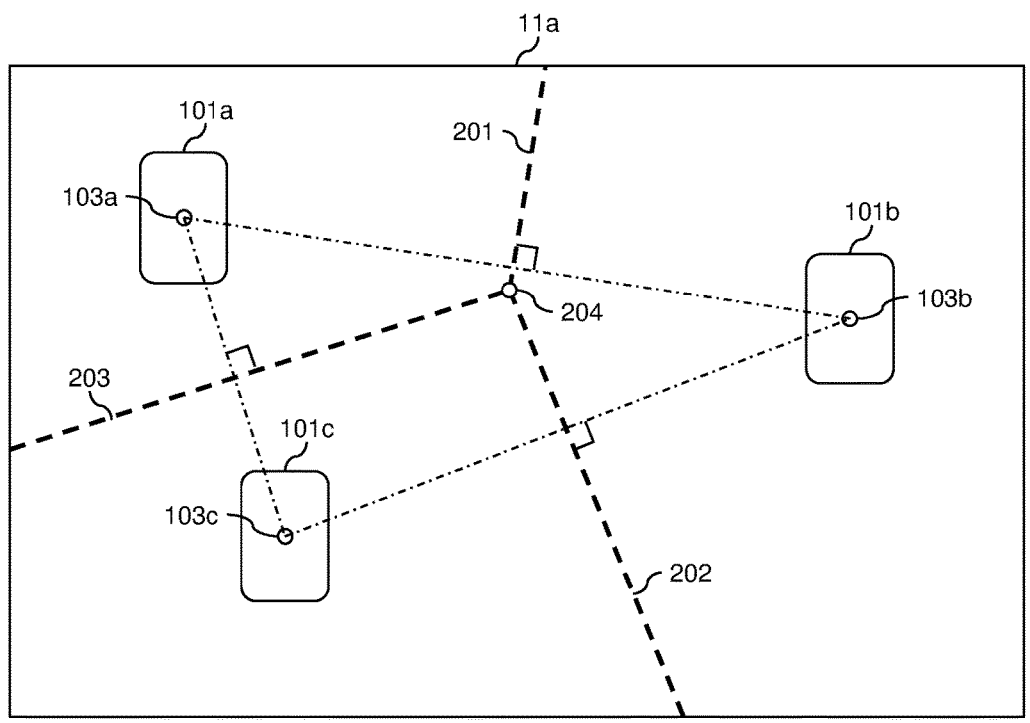
FIG. 8 is a diagram for illustrating the operation according to variational example 1 of the display control devices shown in FIGS. 1 and 2.

That is, as shown in FIG. 8 display control device 14 determines line segment 201 that passes through the middle point of the line segment connecting reference point 103a of dialogue 101a to reference point 103b of dialogue 101b and is perpendicular to this line segment. Display control device 14 also determines line segment 202 that passes through the middle point of the line segment connecting reference point 103b of dialogue 101b to reference point 103c of dialogue 101c and is perpendicular to this segment. Display control device 14 further determines line segment 203 that passes through the middle point of the line segment connecting reference point 103c of dialogue 101c to reference point 103a of dialogue 101a and is perpendicular to this segment.

Then, when the start point of a drawing is included in the area including dialogue 101a and sectioned by line segment 201 and line segment 203, display control device 14 displays a drawn image corresponding to the drawing in accordance with the setting for dialogue 101a. When the start point of a drawing is included in the area including dialogue 101b and sectioned by line segment 201 and line segment 202, display control device 14 displays a drawn image corresponding to that drawing in accordance with the setting for dialogue 101b. When the start point of a drawing is included in the area including dialogue 101c and sectioned by line segment 202 and line segment 203, display control device 14 displays a drawn image corresponding to that drawing in accordance with the setting for dialogue 101c.

The method of determining the boundary lines (line segments 201 to 203) used for selection of settings for display of drawn images is not limited to the above-described method, but the boundaries are preferably determined so that the vicinal area around a dialogue will be included in the area including that dialogue. With this arrangement, when the user starts drawing at a point close to a dialogue, the drawn image for the drawing is displayed in accordance with the setting corresponding to the dialogue, so that the user can easily and intuitively recognize how the image drawn by oneself is displayed. Here, the number of dialogues may also be four or more.

Variational Example 2

The exemplary embodiment was described by taking a case in which the line segment, that passes through the middle point of a line segment that connects two reference points and that is perpendicular thereto, is used as a boundary line. However, the present invention should not be limited to this. For example, a boundary line may be determined based on the height-to-width ratio (aspect ratio) of the display screen.

Figure 9:
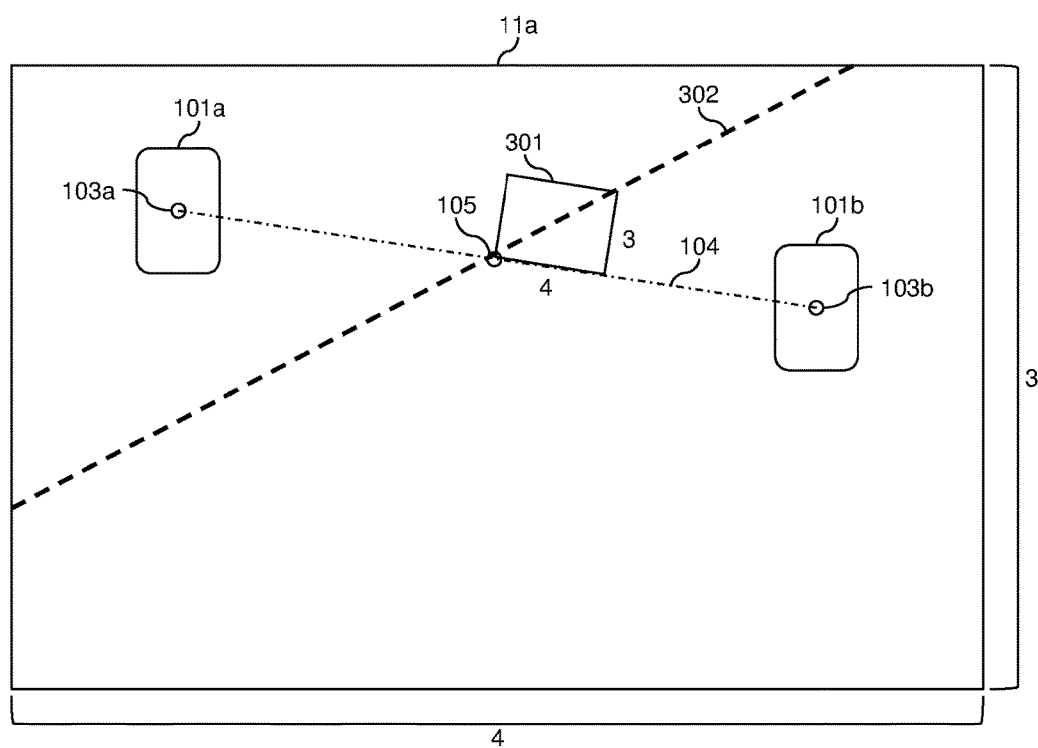
FIG. 9 is a diagram for illustrating the operation according to variational example 2 of the display control devices shown in FIGS. 1 and 2.

Specifically, as shown in FIG. 9, display control device 14 determines as a boundary, line segment 302 that passes through middle point 105 of line segment 104 connecting reference point 103a to reference point 103b and the opposite apex of rectangle 301 of an aspect ratio of 3:4 having middle point 105 as an apex thereof.

This makes it possible to set up a boundary line that is more suited to the way in which the user uses the system.

Figure 10:
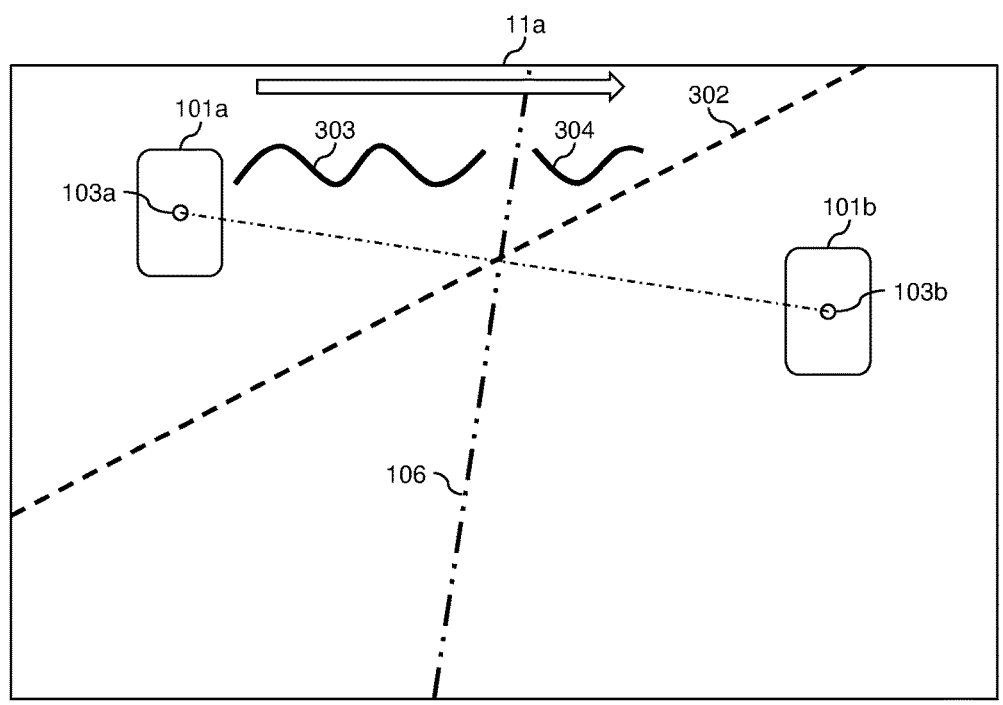
FIG. 10 is a diagram for illustrating the operation according to variational example 2 of the display control devices shown in FIGS. 1 and 2.
Figure 11:
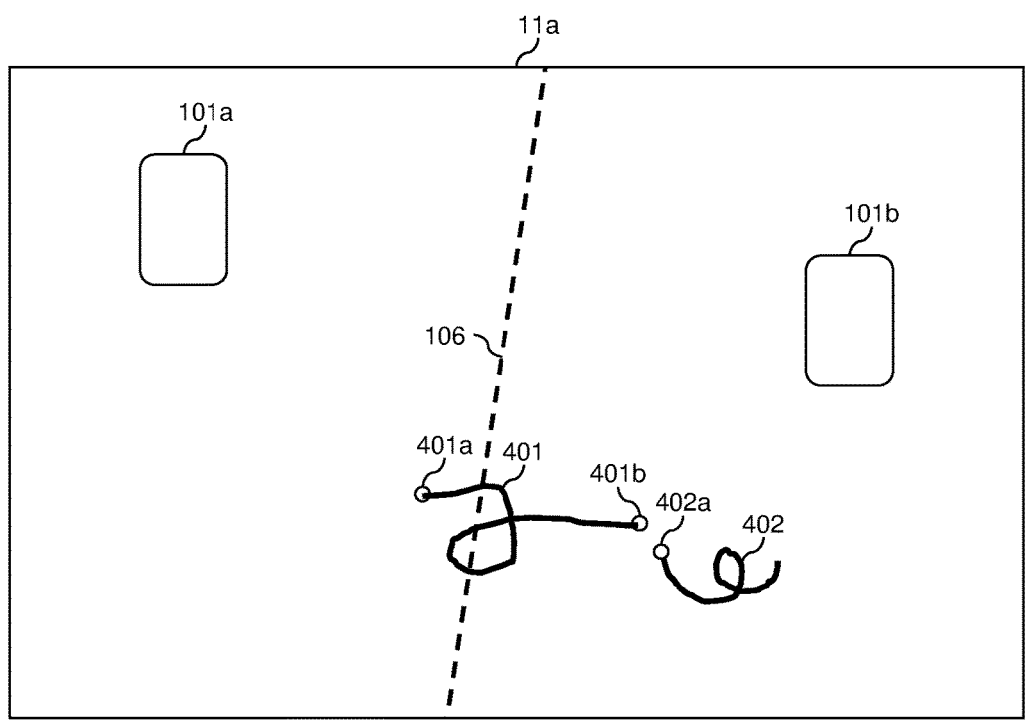
FIG. 11 is a diagram for illustrating the operation according to variational example 3 of the display control devices shown in FIGS. 1 and 2.

For example, when display screen 11a has a laterally long shape, the user who starts drawing from around dialogue 101a, draws in the lateral direction shown by the outlined arrow in FIG. 10 to form drawn image 303, then may begin new drawing of drawn image 304. In such case, the drawing of drawn image 304 may be started from a point that is located beyond the boundary line (line segment 106 (illustrated by tow-dot chain line in FIG. 10)). When the drawing start point of drawn image 304 is located beyond the boundary line (line segment 106), drawn image 304 is displayed in accordance with the setting corresponding to dialogue 102b, hence drawn image 303 and drawn image 304 of drawings made by the same user would end up being displayed in different modes.

On the other hand, according to this variational example, as shown in FIG. 10 the drawing start point of drawn image 304 is also contained in the area including dialogue 101a, so that drawn image 303 and drawn image 304 can be displayed in the same mode.

Variational Example 3

There occur cases where drawing end point 401b of drawn image 401 that started from start point 401a in the area including dialogue 101a extends beyond the boundary line (line segment 106). Even in this case, since drawing start point 401a of drawn image 401 is contained in the area including dialogue 101a, drawn image 401 is displayed in accordance with the setting corresponding to dialogue 101a.

Suppose that following the drawing of drawn image 401 the same user starts a drawing of drawn image 402 from point 402a near drawing end point 401b of drawn image 401. In this case, drawing start point 402 of drawn image 402 resides in the area including dialogue 101b, so that drawn image 402 is displayed in accordance with the setting corresponding to dialogue 101b in the above-described exemplary embodiment. Accordingly, in the above-described exemplary embodiment there may occur a case where, when the same user draws a certain drawn image and then another drawn image, the drawn image of the former drawing and the drawn image of the latter drawing are displayed in different modes.

In this variational example, display control device 14 performs the following operation in order to deal with the above case, or prevent the drawn image corresponding to the former drawing and the drawn image corresponding to the latter drawing from being displayed in different modes.

Specifically, in this variational example, display control device 14, when a drawing is completed, sets up a predetermined range (for example, a circle with a predetermined radius centered at the drawing end point) centered at the end point of the drawing. Then, when a new drawing after the end of the preceding drawing begins from a start point residing within the setup predetermined range, display control device 14 causes the drawn image corresponding to the latter drawing to display in the same mode as the drawn image corresponding to the former drawing.

Figure 12:
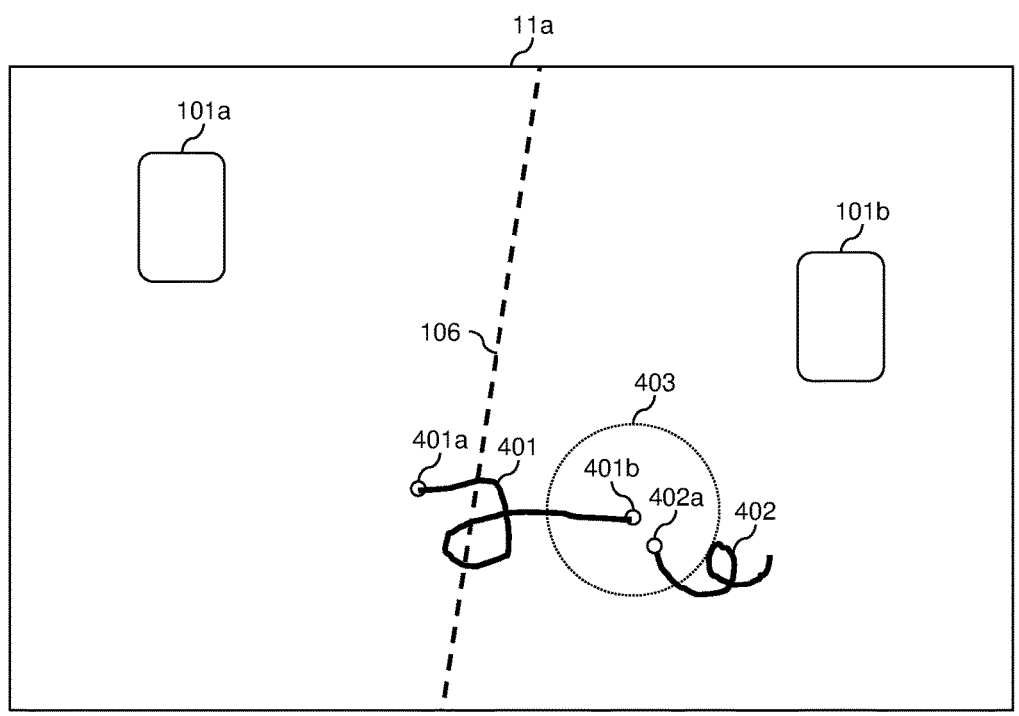
FIG. 12 is a diagram for illustrating the operation according to variational example 3 of the display control devices shown in FIGS. 1 and 2.

In the example shown in FIG. 12, drawing start point 402a of drawn image 402 resides within circle 403 of a predetermined radius centered at drawing end point 401b of drawn image 401. In this case, though start point 402a of drawn image 402 resides in the area including dialogue 101b, display control device 14 displays drawn image 402 in accordance with the setting corresponding to dialogue 101b. This configuration makes it possible to display multiple drawn images in the same mode even if the multiple drawn images were drawn across the boundary line (line segment 106).

Here, display control device 14 may be configured such that when a new drawing is started within a predetermined period of time from the completion of a first drawing, the drawn image for the first drawing and the drawn image for the second drawing are displayed in the same mode.

Variational Example 4

In the above-described exemplary embodiment, display control device 14 has dialogues 101 (reference point 103) set at fixed positions. However, the position of dialogue 101 (reference point 103) may be dynamically changed.

Specifically, in this variational example, when changing the position of the reference point, display control device 14 sets up a new reference point at the end point of the pervious drawing. This configuration allows the drawn image corresponding to a new drawing to be displayed in the same mode as that for the drawn image for the previous drawing when the new drawing is started from the vicinity of the end point of the previous drawing.

Here, if there is no existing end point of the previous drawing when, for example the image display system is just activated, reference points 103a and 103b respectively corresponding to dialogues 101a and 101b may be used in the same manner as described in the above exemplary embodiment.

Now, a specific example will be explained.

Figure 13:
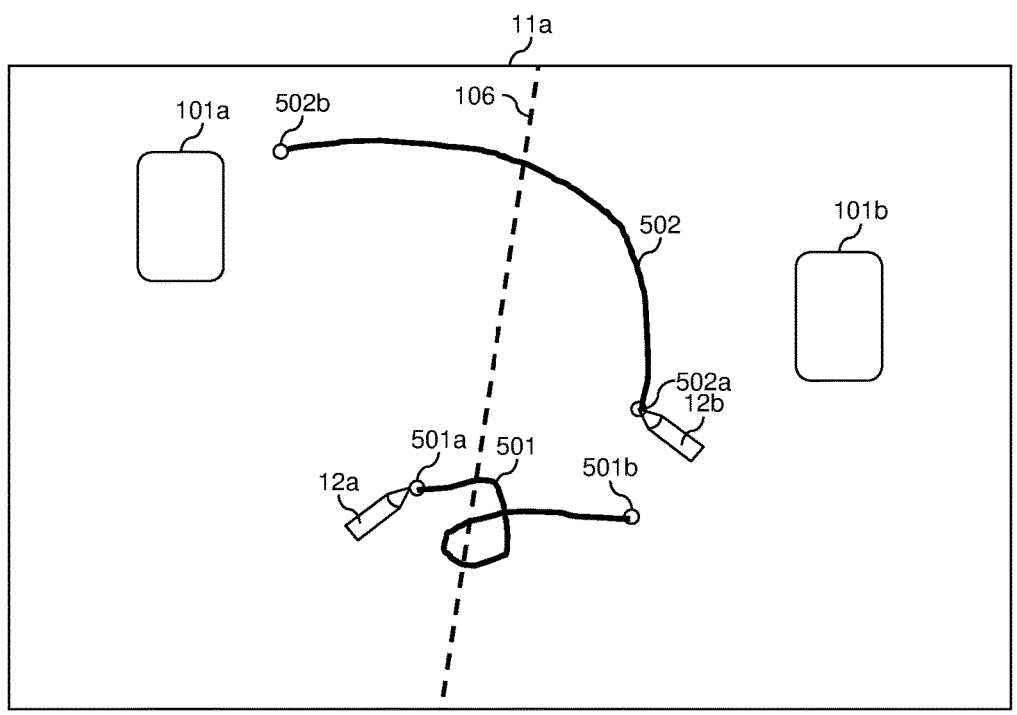
FIG. 13 is a diagram for illustrating the operation according to variational example 4 of the display control devices shown in FIGS. 1 and 2.
Figure 14:
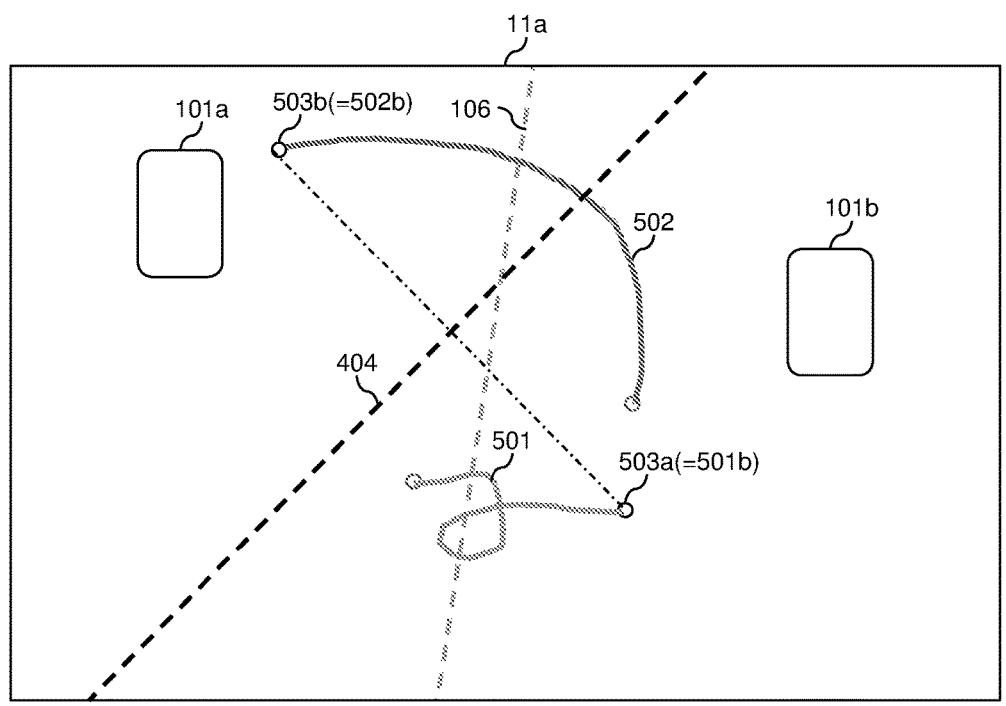
FIG. 14 is a diagram for illustrating the operation according to variational example 4 of the display control devices shown in FIGS. 1 and 2.

As shown in FIG. 13, it is assumed that input device 12a is used to start drawing of drawn image 501 from the starting point, designated at 501a, residing in the area including dialogue 101a. It is also assumed that drawing of drawn image 502 is started from the starting point, designated at 502a, residing in the area including dialogue 101b. There-after, when reference points are changed, display control device 14 designates drawing end point 501*b* of drawn image 501 as new reference point 503*a* corresponding to dialogue 101*a* and drawing end point 502*b* of drawn image 502 as new reference point 503*b* corresponding to dialogue 101*b*. As a result of change of reference points, the boundary line for selecting the settings for display of drawn images is modified from line segment 106 to line segment 404.

In this way, change of reference points makes it possible when, for example the user has completed a first drawing and then starts another drawing from the vicinity of the end point of the first drawing, to display the drawn image corresponding to the first drawing and the drawn image corresponding to the second drawn image in the same mode.

It should be noted in the above-described exemplary embodiments, the display control device may be configured to be built in the display device. Alternatively, the display control device may be configured so as to communicate with the detecting device via the display device.

Figure 15:
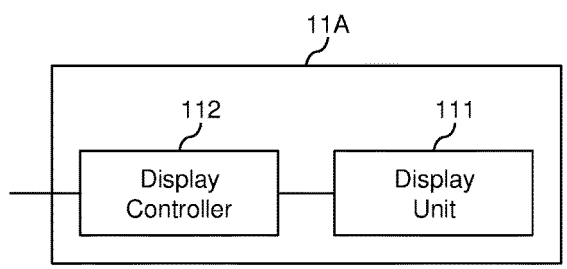
FIG. 15 is a block diagram showing one configurational example of a display device according to the present invention.

Further, the display control device may be configured so as to communicate with the display device via the detecting device. FIG. 15 is a block diagram showing a configuration of a display device incorporating a display control device (display controller).

Display device 11A shown in FIG. 15 includes display unit 111 and display controller 112.

Display unit 111 displays images in accordance with control of display controller 112.

Display controller 112 communicates with detecting device 13 via a communication unit though not shown in FIG. 15 to control display of display unit 111. For example, display controller 112, upon receiving a detection result by detecting device 13 of the drawing on the display screen of display unit 111 by means of input device 12, from detecting device 13 via the communication unit, causes display unit 111 to display an image in accordance with the drawing based on the detection result. Since the operation of display control that is performed by display controller 112 is the same as the operation of display control of display controller 111, detailed description is omitted.

Although the present invention has been explained with reference to the exemplary embodiments, the present invention should not be limited to the above exemplary embodiments. Various modifications that can be understood by those skilled in the art may be made to the structures and details of the present invention within the scope of the present invention.

The invention claimed is:

1. A display control device comprising a display controller that, in accordance with a drawing on a display screen of a display device using an input device that points to a position on the display screen, causes the display device to display an image corresponding to the drawing,
   wherein the display screen comprises a region for displaying an image,
   wherein the image corresponding to the drawing comprises a trace of the position pointed by the input device,
   wherein the region is divided into a plurality of areas defined by multiple reference points provided thereon,
   wherein the display control device has a setting for each of the plurality of areas at which the image corresponding to the drawing in conformity with the setting of an area that is one of the plurality of areas and the area that corresponds to the position of the region at which the drawing has been started,
   wherein a number of the multiple reference points is equal to a number of the plurality of areas,
   wherein one reference point is included in each of plurality of areas, and
   wherein the display controller causes the display device to display a dialogue showing a setting for display of an image corresponding to a drawing on the region and sets up a reference point for an area of one of the plurality of areas at a position corresponding to the dialogue.

2. The display control device according to claim 1, wherein
   the display controller receives a detection result of a position on the region pointed to by the input device, from a detecting device for detecting the position pointed by the input device, on the region of the display device and determines that the drawing has been started based on the received detection result.

3. The display control device according to claim 1, wherein
   the display controller sets up the plurality of areas based on a line segment that passes through the middle point of another line segment that connects neighboring reference points and that is perpendicular to the another segment.

4. The display control device according to claim 1, wherein
   when a drawing is completed, the display controller changes positions of the multiple reference points in accordance with a position on the region at which the drawing has ended.

5. The display control device according to claim 1 wherein
   when a previous drawing was ended and a new drawing is started within a predetermined period of time or from a point within a predetermined range from a position where the previous drawing was ended, the display controller causes the display device to display an image corresponding to the new drawing in accordance with a same setting for the previous drawing.

6. The display control device according to claim 1, wherein the detecting device detects the position pointed by the input device including a first input device and a second input device, on the region of the display device, and once the drawing begins, the display control device displays the drawn image of the drawing in accordance with the setting for the area including the drawing start point with no prior data of whether each drawing is performed by the first input device or the second input device.

7. The display control device according to claim 1, wherein settings of each of the plurality of areas are different from each other depending on the plurality of areas.

8. The display control device according to claim 1, wherein the setting of each of the plurality of areas includes at least a color setting or a line type setting to display the image corresponding to the drawing.

9. A display control method of a display device, comprising:
   in accordance with a drawing on a display screen of a display device using an input device that points to a position on the display screen,
   causing the display device to display an image corresponding to the drawing,
   wherein the display screen comprises a region for displaying an image, wherein the image corresponding to the drawing comprises a trace of the position pointed by the input device, wherein the region is divided into a plurality of areas defined by multiple reference points provided thereon, and wherein the display device has a setting for each of the plurality of areas at which the image corresponding to the drawing in conformity with the setting of an area that is one of the plurality of areas and the area that corresponds to the position of the region at which the drawing has been started, wherein a number of the multiple reference points is equal to a number of the plurality of areas, wherein one reference point is included in each respective plurality of areas, and wherein the method further comprises causing the display device to display a dialogue showing a setting for display of an image corresponding to a drawing on the region and setting up a reference point for an area for one of the plurality of areas at a position corresponding to the dialogue.

10. The display control method according to claim 9, wherein settings of each of the plurality of areas are different from each other depending on the plurality of areas.

11. The display control method according to claim 9, wherein the setting of each of the plurality of areas includes at least a color setting or a line type setting to display the image corresponding to the drawing.

* * * * *